US011451765B2

(12) United States Patent
Hunt

(10) Patent No.: US 11,451,765 B2
(45) Date of Patent: Sep. 20, 2022

(54) SYSTEM AND METHOD FOR DETERMINING WHEN A SENSOR IS POLLUTED

(71) Applicants: Denso International America, Inc., Southfield, MI (US); DENSO CORPORATION, Kariya (JP)

(72) Inventor: Shawn Hunt, Bethel Park, PA (US)

(73) Assignees: Denso International America, Inc., Southfield, MI (US); Denso Corporation, Aichi (JP)

(*) Notice: Subject to any disclaimer, the term of this patent is extended or adjusted under 35 U.S.C. 154(b) by 0 days.

(21) Appl. No.: 17/158,430

(22) Filed: Jan. 26, 2021

(65) Prior Publication Data
US 2022/0021868 A1 Jan. 20, 2022

Related U.S. Application Data

(60) Provisional application No. 63/052,680, filed on Jul. 16, 2020.

(51) Int. Cl.
*G01S 7/497* (2006.01)
*H04N 17/00* (2006.01)

(52) U.S. Cl.
CPC .......... *H04N 17/002* (2013.01); *G01S 7/497* (2013.01); *G01S 2007/4975* (2013.01)

(58) Field of Classification Search
CPC .................. H04N 17/002; H04N 5/22521
See application file for complete search history.

(56) References Cited

U.S. PATENT DOCUMENTS

| 9,319,637 | B2 * | 4/2016 | Lu | H04N 7/18 |
| 9,445,057 | B2 | 9/2016 | May et al. | |
| 2014/0232869 | A1 * | 8/2014 | May | G06T 7/70 |
| | | | | 348/148 |

OTHER PUBLICATIONS

Gu et al., "Removing Image Artifacts Due to Dirty Camera Lenses and Thin Occluders," ACM Transactions on Graphics, vol. 28, Issue 5, Dec. 2009, 10 pages.

* cited by examiner

*Primary Examiner* — Jerry T Jean Baptiste
(74) *Attorney, Agent, or Firm* — Christopher G. Darrow; Darrow Mustafa PC

(57) ABSTRACT

A system includes a processor and a memory in communication with the processor having one or more modules. The modules include instructions that cause the processor to receive first sensor information from a first sensor and second sensor information of a shared field of view. The instructions cause the processor to detect one or more objects within the shared field of view using the first sensor information and the second sensor information. When one or more discrepancies are identified between the one or more objects detected using the first sensor information and the one or more objects detected using the second sensor information are detected, the instructions that cause the processor to determine that the first sensor or the second sensor needs cleaning.

17 Claims, 5 Drawing Sheets

SYSTEM AND METHOD FOR DETERMINING WHEN A SENSOR IS POLLUTED

CROSS-REFERENCE TO RELATED APPLICATION

This application claims the benefit of U.S. Provisional Patent Application No. 63/052,680, entitled "Vision-Based LIDAR Dirt Detector," filed Jul. 16, 2020, which is incorporated by reference herein in its entirety.

TECHNICAL FIELD

The subject matter described herein relates, in general, to systems and methods for determining when a sensor is dirty or is otherwise polluted and needs cleaning.

BACKGROUND

The background description provided is to present the context of the disclosure generally. Work of the inventor, to the extent it may be described in this background section, and aspects of the description that may not otherwise qualify as prior art at the time of filing, are neither expressly nor impliedly admitted as prior art against the present technology.

Some vehicles are equipped with one or more sensors for detecting objects located in the environment in which the vehicle operates. Numerous different types of sensors may be utilized, such as radar sensors, sonar sensors, cameras, and light detection and ranging ("LIDAR") sensors. As one example, cameras, sometimes referred to as camera sensors, may include one or more image sensors housed within a housing. An optical assembly, which may include one or more lenses, directs light from the external environment towards the image sensors housed within the housing. While operating differently, LIDAR sensors also include one or more sensors for detecting reflected light and may be encased within a protective dome or other structure.

However, the performance of these sensors can be impacted by pollution that may collect on part of the sensor. For example, the lens of a sensor or protective dome may become covered with dirt or other pollutants that collect during the normal operation of the vehicle, which may impact the ability of the sensors to collect accurate information. The sensors' ability to collect information may impact downstream processes, such as object detection and tracking algorithms that may be utilized to detect and/or track objects external to the vehicle using information from the sensors.

SUMMARY

This section generally summarizes the disclosure and is not a comprehensive explanation of its full scope or all its features.

In one example, a system for determining when a sensor should be cleaned may include a processor and a memory in communication with the processor. The memory may include modules that include instructions that cause the processor to perform any one of a number of different actions. In one example, the memory may include a receiver module, an object detection module, and a pollution detection module.

With regards to the receiver module, the receiver module includes instructions that, when executed by the processor, cause the processor to receive first sensor information from a first sensor mounted to a vehicle having a first field of view and receive second sensor information from a second sensor mounted to the vehicle having a second field of view. At least a portion of the second field of view overlaps at least a portion of the first field of view to define a shared field of view. The object detection module includes instructions that, when executed by the processor, cause the processor to detect one or more objects within the shared field of view using the first sensor information and detect one or more objects within the shared field of view using the second sensor information.

The pollution detection module includes instructions that, when executed by the processor, cause the processor to determine one or more discrepancies between the one or more objects detected using the first sensor information and the one or more objects detected using the second sensor information and determine when one of the first sensor and the second sensor needs cleaning based on the one or more discrepancies. If a discrepancy is detected, the pollution module may cause the processor to send a signal to an output device to inform an operator of the vehicle that one of the sensors needs cleaning.

In another example, a method for determining when a sensor should be cleaned may include the steps of receiving first sensor information from a first sensor mounted to a vehicle having a first field of view and receiving second sensor information from a second sensor mounted to the vehicle having a second field of view. At least a portion of the second field of view overlaps at least a portion of the first field of view to define a shared field of view.

The method may then perform the steps of detecting one or more objects within the shared field of view using the first sensor information, detecting one or more objects within the shared field of view using the second sensor information, determining one or more discrepancies between the one or more objects detected using the first sensor information and the one or more objects detected using the second sensor information, determining when one of the first sensor and the second sensor needs cleaning based on the one or more discrepancies.

In yet another example, a non-transitory computer-readable medium may store instructions that, when executed by a processor, causes the processor to receive first sensor information from a first sensor mounted to a vehicle having a first field of view and receive second sensor information from a second sensor mounted to the vehicle having a second field of view. At least a portion of the second field of view overlaps at least a portion of the first field of view to define a shared field of view.

The non-transitory computer-readable medium may store instructions that, when executed by a processor, causes the processor to detect one or more objects within the shared field of view using the first sensor information, detect one or more objects within the shared field of view using the second sensor information, determine one or more discrepancies between the one or more objects detected using the first sensor information and the one or more objects detected using the second sensor information, and determine when one of the first sensor and the second sensor needs cleaning based on the one or more discrepancies.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements, or multiple elements may be designed as one element. In some embodiments, an element shown as an internal component of another element may be implemented as an external component and vice versa. Furthermore, elements may not be drawn to scale.

DETAILED DESCRIPTION

Described are a sensor pollution detection system and related method. Some vehicles have sensors for collecting information regarding the environment surrounding the vehicle. The sensors may be the same type of sensors, for example, camera sensors, or maybe a mixture of different types of sensors, such as camera sensors, LIDAR sensors, radar sensors, sonar sensors, and the like. As a vehicle is operated in the environment, it is common for vehicles to become dirty over time. As such, pollution, which may be in the form of dirt or other environmental elements that may attach to one or more parts of the vehicle, may come into contact with portions of different sensors that impact the ability of the sensors to collect information regarding the environment. This impact on the ability of the sensors to collect information may affect downstream processes, such as object detection and tracking.

The sensor pollution detection system can determine when a least one of the vehicle sensors may be polluted with dirt or other environmental contaminants. Here, in one example, the sensor pollution detection system utilizes information from two different sensors that may have an overlapping field of view, referred to as a shared field of view. The system and method utilize any number of object detection algorithms based on information received from these different sensors. As such, the object detection algorithm may determine the number of objects in the shared field of view from information from one sensor and then determine the number of objects in the shared field of view from information from the other sensor. If there are no discrepancies, it is generally believed that the sensors are relatively clean and are not polluted or dirtied, such that they are less functional. However, if there are discrepancies, the system may provide a signal that may be outputted to an operator of the vehicle, indicating that one or more of the sensors are polluted and should be cleaned.

Figure 1:
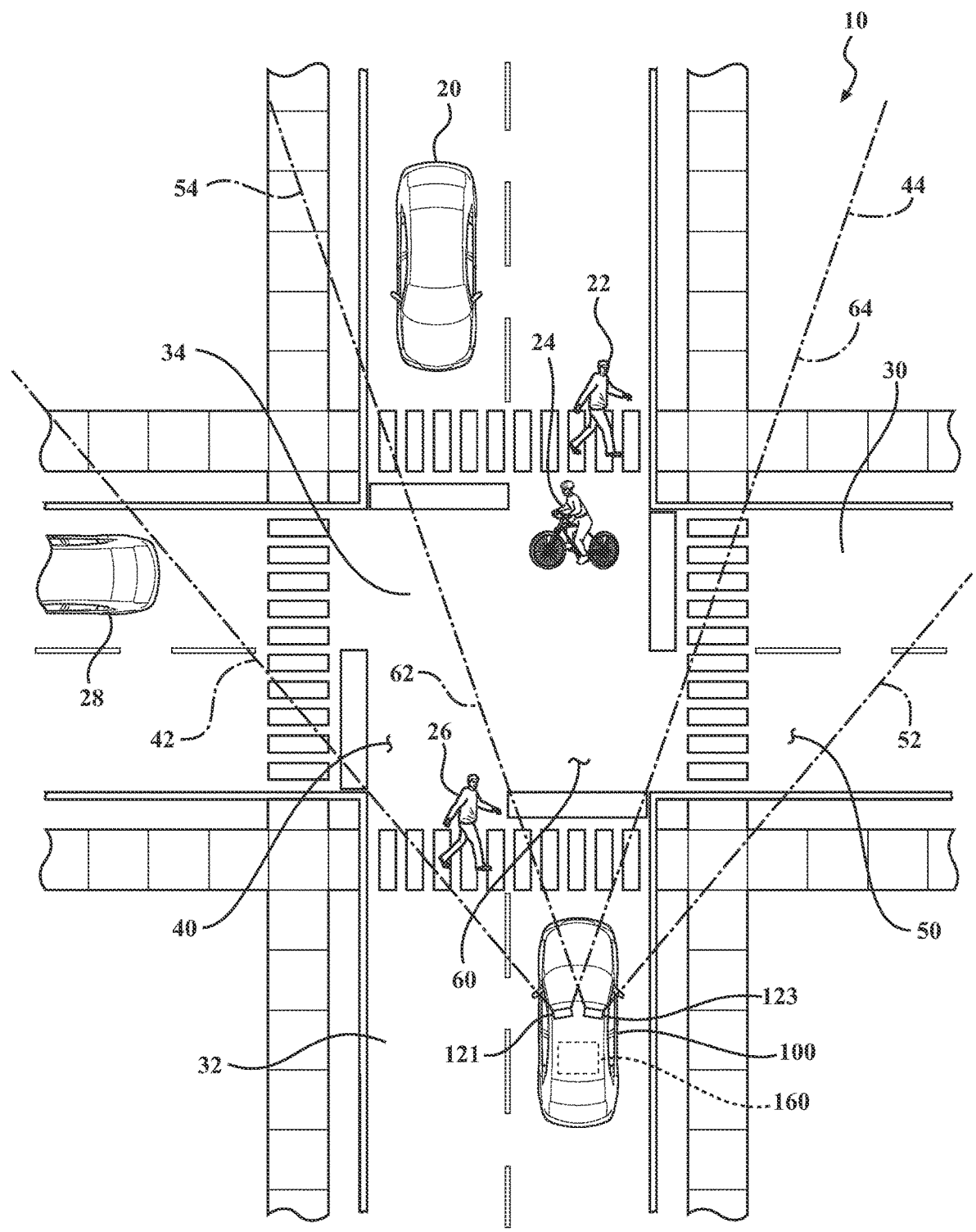
FIG. 1 illustrates an example situation illustrating a system and method for determining when a sensor is polluted.

To illustrate this point, reference is made to FIG. 1, which illustrates a scene 10. Here, the scene 10 illustrates the environment that includes an intersection 34 of two roads 30 and 32. The vehicle 100 includes a sensor pollution detection system 160. Also mounted to the vehicle 100 are sensors 121 and 124. In this example, the sensors 121 and 124 are different types of sensors. For example, the sensor 121 may be a LIDAR sensor while the sensor 124 may be a camera sensor. However, it should be understood that the sensors 121 and 124 may be the same types of sensors and do not necessarily need to be different.

In the scene 10, numerous objects are present outside of the vehicle 100. For example, a vehicle 20 is located on the road 30 and generally opposes the vehicle 100. Also, pedestrians 22 and 26 are crossing the road 32 in front of both the vehicle 100 and the vehicle 20. A bicyclist 24 is seen traveling along the road 32 generally in front of the vehicle 20 and the vehicle 100. Finally, a vehicle 28 is shown traveling along the road 32 and is generally exiting the scene 10.

As stated previously, the vehicle 100 includes a sensor 121 and a sensor 124. The sensor 121 has a field of view 40 that is bounded by borders 42 and 44. The sensor 124 has a field of view 50 that is bounded by borders 52 and 54. As such, a shared field of view 60 that includes portions of the field of view 40 and the field of view 50 that overlap each other is defined between the borders 62 and 64.

Therefore, the sensor 121 and the sensor 124 both receive information regarding any objects located within the shared field of view 60. The shared field of view 60 includes the vehicle 20, the pedestrian 22, and the bicyclist 24. However, the shared field of view 60 does not include the pedestrian 26, as the pedestrian 26 is only within the field of view 40 of the sensor 121 and is not within the field of view 50 of the sensor 124. Further, the vehicle 28 is located outside the field of view 40 of the sensor 121 and the field of view 50 of the sensor 124 and is therefore not within the shared field of view 60.

Here, as will be explained in greater detail later, the sensor pollution detection system 160 uses information from the sensors 121 and 124, including information regarding the presence of any objects within the shared field of view 60. The information collected from the sensors 121 and 124 may be collected when the vehicle 100 is at a standstill to remove any unnecessary variables or account for the movement of the vehicle 100.

The sensor pollution detection system 160 utilizes one or more object detection algorithms to detect objects within the shared field of view 60 based on information from the sensor 121. Similarly, the sensor pollution detection system 160 utilizes one or more object detection algorithms to detect objects within the shared field of view 60 based on information from the sensor 124. As such, the sensor pollution detection system 160 should have two sets of outputs from the object detection algorithms. The first output relates to the objects within the shared field of view 60 detected by the sensor 121. The second output relates to the objects within the shared field of view 60 detected by the sensor 124.

Using these two outputs, the sensor pollution detection system 160 compares these two outputs to determine if there are any discrepancies. Moreover, if the sensors are clean and are operating properly, the number of objects detected in the shared field of view 60 using information from the sensor 121 should match the number of objects detected in the shared field of view 60 using information from the sensor 124. If there is a discrepancy, the sensor pollution detection system 160 may output a signal that may be provided to the operator of the vehicle 100 to check the sensor 121 and/or the sensor 124 and potentially clean the sensor 121 and/or the sensor 124. In some cases, if one of the sensors detected fewer objects than another sensor, the sensor that detected the fewer objects may be indicated as the dirty or polluted sensor.

Also, it should be noted that while the output of two different sensors of an overlapping field of view may be utilized by the sensor pollution detection system 160, it should be equally understood that information from more than two sensors regarding a shared field of view may be utilized. The sensor pollution detection system 160 may use information from two or more sensors to determine if there any discrepancies in the number of objects detected from information from the sensors.

As such, in the example given in FIG. 1, the sensor 121 and the sensor 124 should each be providing information to the object detection algorithms to detect three objects within the shared field of view 60. As stated before, these three objects include the vehicle 20, the pedestrian 22, and the bicyclist 24. If there is a discrepancy regarding the number of objects, the sensor pollution detection system 160 may output a signal indicating that one of the sensors may need cleaning. In addition to looking at the number of objects, other information could be utilized as well. For example, some object detection algorithms can determine object type as well. If there is a discrepancy between different object types, the sensor pollution detection system 160 may output an appropriate signal indicating that one of the sensors may be dirty or otherwise polluted and may need cleaning.

Figure 2:
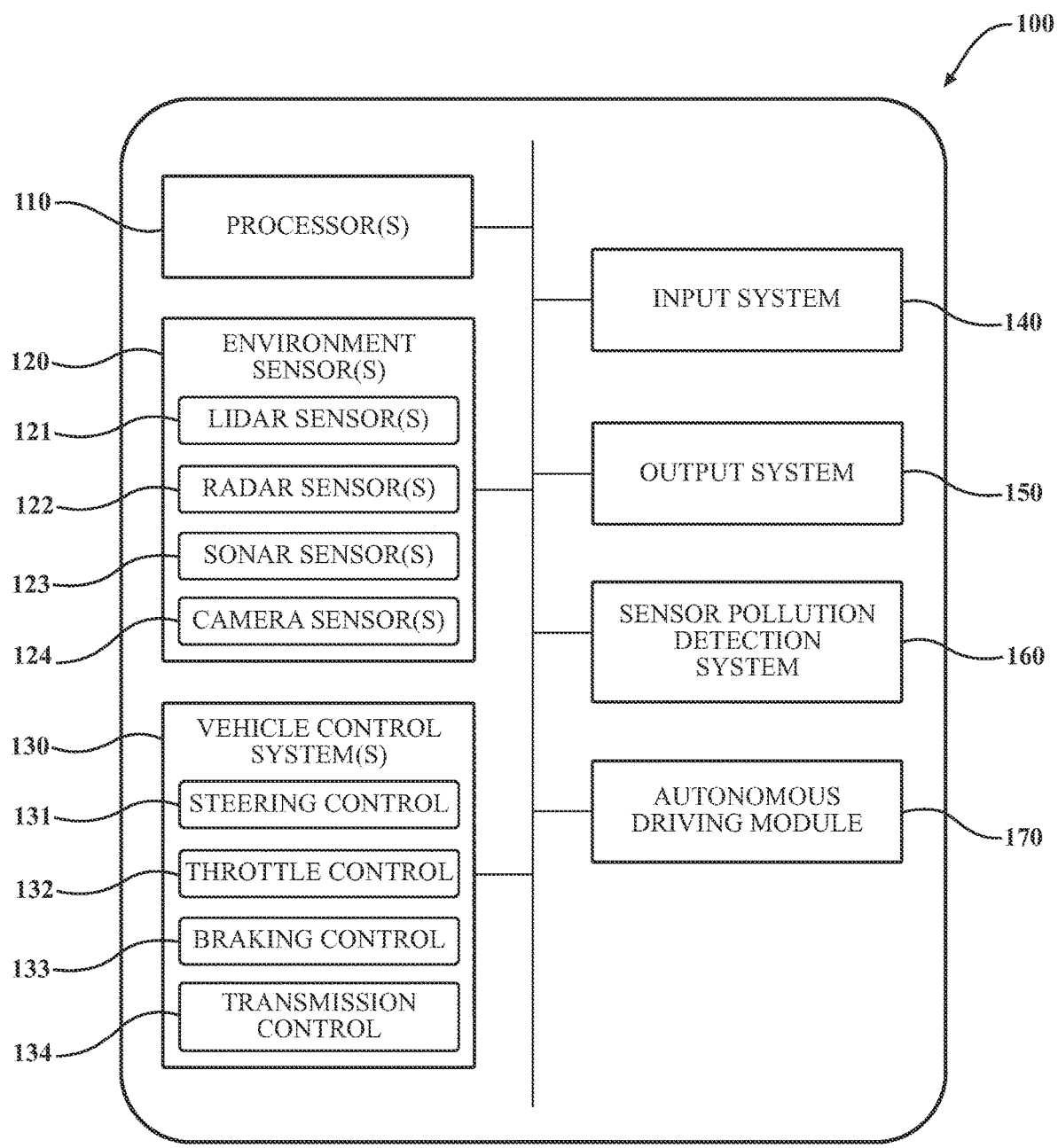
FIG. 2 illustrates a block diagram of a vehicle incorporating a sensor pollution detection system.

FIG. 2 illustrates an example of a vehicle 100 that may incorporate the sensor pollution detection system 160. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any robotic device or form of powered transport that, for example, includes one or more automated or autonomous systems and thus benefits from the functionality discussed herein.

In various embodiments, the automated/autonomous systems or combination of systems may vary. For example, in one aspect, the automated system is a system that provides autonomous control of the vehicle according to one or more levels of automation, such as the levels defined by the Society of Automotive Engineers (SAE) (e.g., levels 0-5). As such, the autonomous system may provide semi-autonomous control or fully autonomous control, as discussed in relation to the autonomous driving system 170.

The vehicle 100 also includes various elements. It will be understood that in various embodiments, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances and provided as remote services (e.g., cloud-computing services).

Some of the possible elements of the vehicle 100 are shown in FIG. 1 and will be described along with subsequent figures. However, a description of many of the elements in FIG. 1 will be provided after the discussion figures for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. It should be understood that the embodiments described herein may be practiced using various combinations of these elements.

The vehicle 100 can include the processor(s) 110. In one or more arrangements, the processor(s) 110 can be a main processor of the vehicle 100. For instance, the processor(s) 110 can be an electronic control unit (ECU). The vehicle 100 can include the sensor system 120. The sensor system 120 can include one or more sensors. "Sensor" means any device, component, and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently. Alternatively, two or more of the sensors can work in combination with each other. In such a case, the two or more sensors can form a sensor network. The sensor system 120 and/or the one or more sensors can be operatively connected to the processor(s) 110 and/or another element of the vehicle 100 (including any of the elements shown in FIG. 1). The sensor system 120 can acquire data of at least a portion of the external environment of the vehicle 100.

The sensor system 120 can include any suitable type of sensor. Various examples of different types of sensors will be described herein. The sensor system 120 can include one or more environment sensors configured to acquire, and/or sense driving environment data. "Driving environment data" includes data or information about the external environment in which an autonomous vehicle is located or one or more portions thereof. For example, the one or more environment sensors can be configured to detect, quantify and/or sense obstacles in at least a portion of the external environment of the vehicle 100 and/or information/data about such obstacles. Such obstacles may be stationary objects and/or dynamic objects. The one or more environment sensors can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. However, it will be understood that the embodiments are not limited to the particular sensors described. As an example, in one or more arrangements, the sensor system 120 can include one or more LIDAR sensors 121, one or more radar sensors 122, one or more sonar sensors 123, and/or one or more camera sensors 124. In one or more arrangements, the one or more camera sensors 124 can be high dynamic range (HDR) cameras or infrared (IR) cameras.

Figure 3:
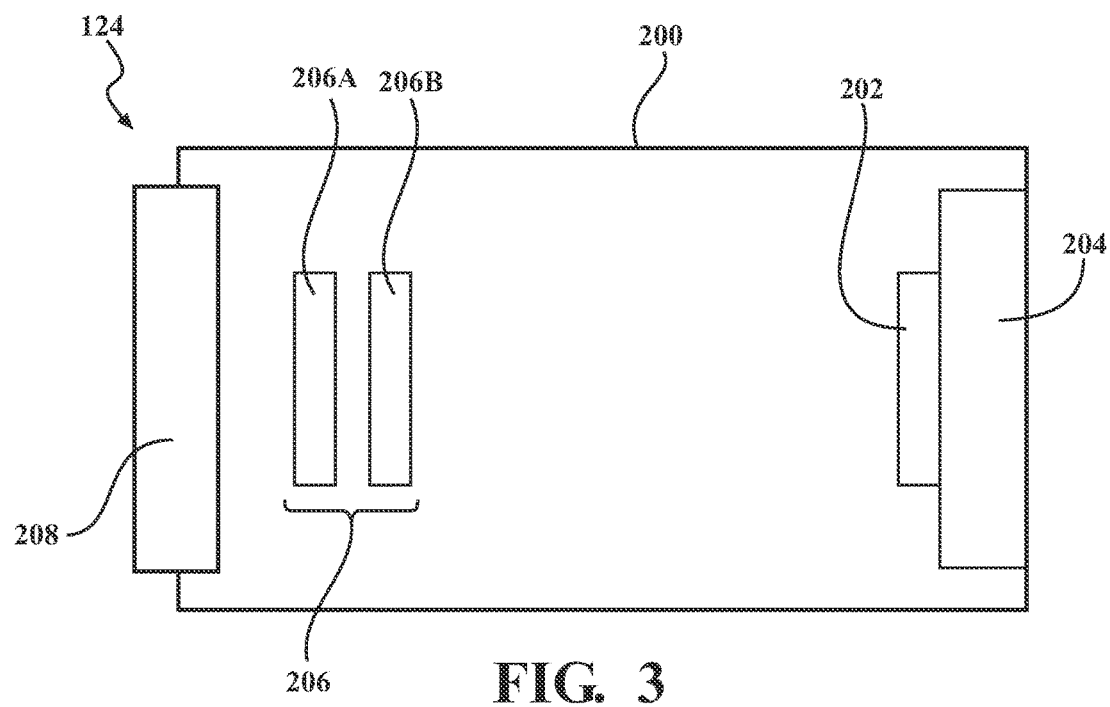
FIG. 3 illustrates one example of a camera sensor that may be utilized with the sensor pollution detection system.

For example, referring to FIG. 3, illustrated is one example of the camera sensor 124 that may be utilized in the vehicle 100. It should be understood that the camera sensor 124 is but one example of a camera sensor, and any type of camera sensor may be utilized. Here, the camera sensor 124 includes a housing 200 that houses one or more components of the camera sensor 124. In this example, located within the housing 200 is an image sensor 202 that may detect and convey information used to make an image. This may occur by having the image sensor 202 convert the variable attenuation of light waves into signals. The image sensor 202 may be mounted to a printed circuit board 204 that may communicate with other components of the vehicle 100.

Light may be directed to the image sensor 202 using an optical assembly 206 that may include one or more lenses. In this example, the optical assembly 206 includes two lenses 206A and 206B. However, it should be understood that the optical assembly 206 may take any one of a number of different forms and may include more, fewer, or even no lenses.

A protective and transparent cover 208 may protect the components located within the housing 200 and allow light to enter into the housing 200 such that the light can pass through the optical assembly 206 and be received by the image sensor 202. The cover 208 is generally transparent and may act as a lens such that it may complement the optical assembly 206 or replace it altogether.

In this example, if it is determined that the sensor 121 is polluted or is otherwise dirty, the operator of the vehicle 100 or any other person can clean the sensor 121. In this example, the cleaning of the sensor 121 may be cleaning the exterior surface of the housing 200 and/or the cover 208 to remove dirt or other pollutants that may impact the ability of light to enter and interact with the image sensor 202.

Figure 4:
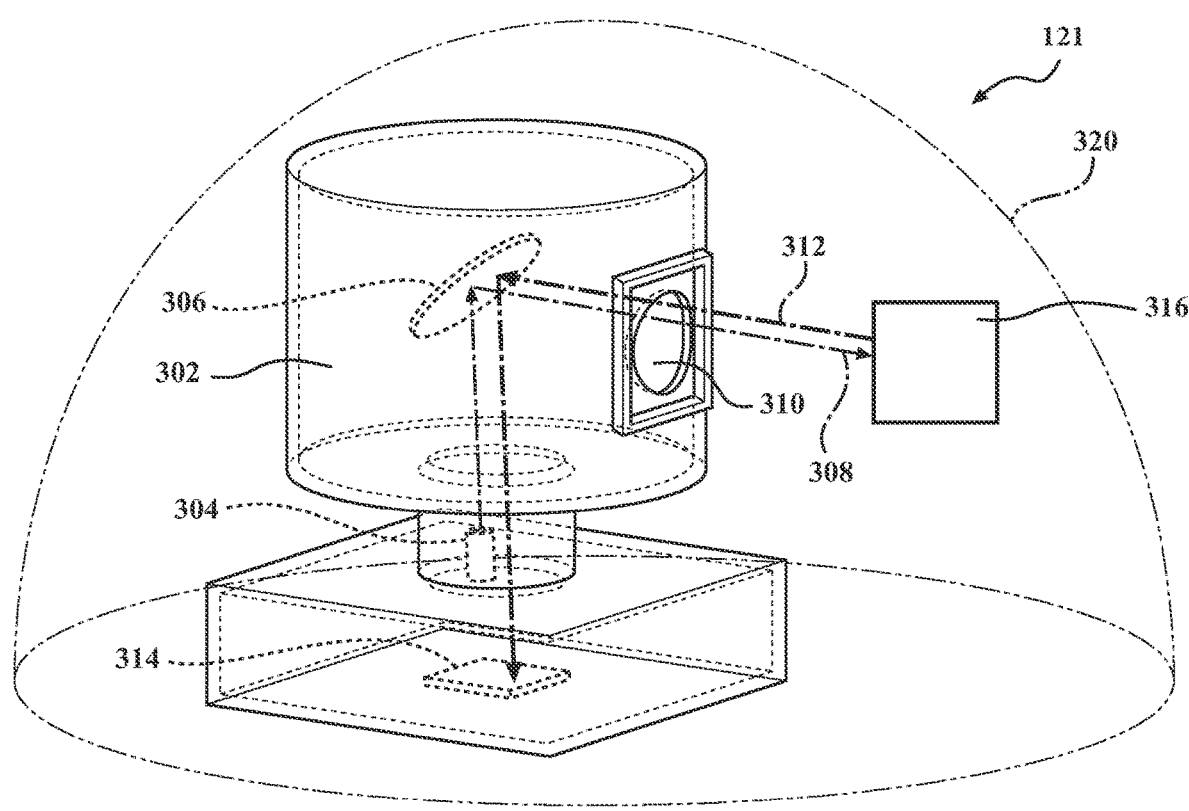
FIG. 4 illustrates one example of a LIDAR sensor that may be utilized with the sensor pollution detection system.

FIG. 4 illustrates an example of the LIDAR sensor 121. LIDAR sensors can take several different forms. In some examples, the LIDAR sensor may be a fixed LIDAR sensor with a limited field of view. In other cases, the LIDAR sensor is a rotating LIDAR sensor that may have a 360° or otherwise expanded field of view. Here, the LIDAR sensor 121, includes a rotatable housing 302. Located within the rotatable housing 302 is a reflector 306 that directs light 308 emitted from an emitter 304 through a protective lens 310 towards an object 316. Light 312 reflected by the object 316 is then sent back to the reflector 306, which is then directed to a sensor 314. The LIDAR sensor 121 can measure differences in return times and wavelengths and generate information that can create a three-dimensional point cloud.

In this example of the LIDAR sensor 121, a protective dome 320, which may be substantially transparent, protects the components of the LIDAR sensor 121, such as the rotatable housing 302, reflector 306, the lens cover 310, the emitter 304, and the sensor 314. If it is determined by the sensor pollution detection system 160 that the LIDAR sensor 121 was dirty or otherwise polluted, an operator of the vehicle 100 or another person may clean the protective dome 320 to remove dirt or other pollutants that may impact the ability of the LIDAR sensor 121 to function. Of course, if no protective dome 320 is utilized, the lens cover 310 or other components of the LIDAR sensor 121 may be cleaned instead.

Figure 5:
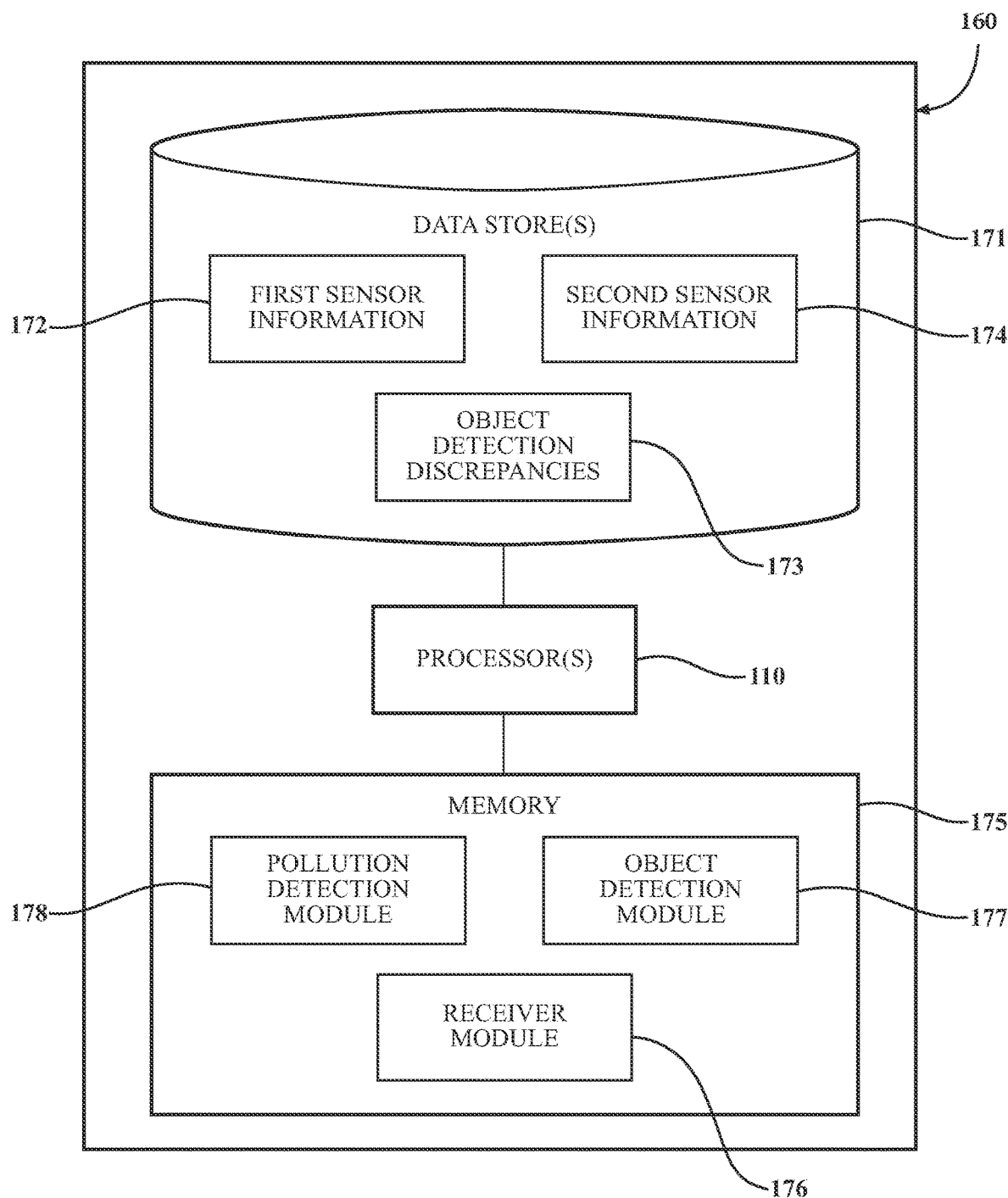
FIG. 5 illustrates a more detailed block diagram of the sensor pollution detection system.

FIG. 5 illustrates a more detailed view of the sensor pollution detection system 160. As shown, the sensor pollution detection system 160 may include one or more processor(s) 110. Accordingly, the processor(s) 110 may be a part of the sensor pollution detection system 160, or the sensor pollution detection system 160 may access the processor(s) 110 through a data bus or another communication path. In one or more embodiments, the processor(s) 110 is an application-specific integrated circuit that is configured to implement functions associated with a receiver module 176, an object detection module 177, and a pollution detection module 178.

In general, the processor(s) 110 is an electronic processor such as a microprocessor capable of performing various functions as described herein. In one embodiment, the sensor pollution detection system 160 includes a memory 175 that stores the receiver module 176, the object detection module 177, and the pollution detection module 178. The memory 175 is a random-access memory (RAM), read-only memory (ROM), a hard disk drive, a flash memory, or other suitable memory for storing the receiver module 176, the object detection module 177, and the pollution detection module 178. The receiver module 176, the object detection module 177, and the pollution detection module 178 are, for example, computer-readable instructions that, when executed by the processor(s) 110, cause the processor(s) 110 to perform the various functions disclosed herein.

Furthermore, in one embodiment, the sensor pollution detection system 160 includes one or more data store(s) 171. The data store(s) 171 is, in one embodiment, an electronic data structure such as a database that is stored in the memory 175 or another memory and that is configured with routines that can be executed by the processor(s) 110 for analyzing stored data, providing stored data, organizing stored data, generating data, and so on. Thus, in one embodiment, the data store(s) 171 stores data used or generated by the receiver module 176, the object detection module 177, and the pollution detection module 178 in executing various functions.

In this example, the data store(s) 171 may include first sensor information 172 collected from a first sensor, such as the sensor 121. This data store(s) 171 may also include second sensor information 174, including information collected from the second sensor, such as the sensor 124. The first sensor information 172 and the second sensor information 174 may relate to information collected regarding a shared field-of-view, such as the shared field-of-view 60 described in FIG. 1.

Object detection discrepancies 173 may also be stored within the data store(s) 171. The object detection discrepancies 173 may represent discrepancies detected within the shared field-of-view between the first sensor information 172 and the second sensor information 174. For example, if an object detection algorithm determined that the first sensor information 172 contains two objects within the shared field-of-view and the object detection algorithm determined that the second sensor information 174 contains three objects field-of-view, these discrepancies can be saved. Additionally, as stated before, the discrepancies can include any discrepancies that indicate a difference regarding objects detected within the shared field-of-view as detected by different sensors. As such, differences regarding the number of objects may be considered as a discrepancy, but other discrepancies may also be considered, such as different object types, movement of the objects, or other object features.

The receiver module 176 may include instructions that, when executed by the processor(s) 110, cause the processor(s) 110 to receive first sensor information from a first sensor mounted to the vehicle having a first field-of-view. As such, returning to the example of FIG. 1, the receiver module 176 may cause the processor(s) 110 to receive information from the sensor 121 regarding the field-of-view 40.

In like manner, the receiver module 176 may include instructions that, when executed by the processor(s) 110, cause the processor(s) 110 to receive second sensor information from a second sensor mounted to the vehicle having a second field-of-view. Like before, returning to FIG. 1, the receiver module 176 may cause the processor(s) 110 to receive information from the sensor 124 regarding the field-of-view 50.

It should be noted that the collection of the first and second sensor information may occur when the vehicle 100 is at a standstill. It may be advantageous to collect the first and second sensor information when the vehicle 100 is at a standstill to remove any additional variables and have to account for the movement of the vehicle 100 when comparing objects detected within a shared field-of-view. The receiver module 176 may also cause the processor(s) 110 to determine if the vehicle 100 is at a standstill and then only collect the first sensor information and the second sensor information when the vehicle 100 is at a standstill. However, it should be understood that this may be optional.

The object detection module 177 may include instructions that cause the processor(s) 110 to detect one or more objects within the shared field-of-view using the first sensor information. Similarly, the object detection module 177 may include instructions that cause the processor(s) 110 to detect one or more objects within the shared field-of-view using the second sensor information.

The object detection may be performed using any one of a number of different object detection algorithms. It is possible that the same object detection algorithm may be utilized for the first sensor information and the second sensor information or different object detection algorithms may be utilized. For example, if the first sensor information and the second sensor information are generated by the same type of sensors, such as camera sensors, the same object detection algorithm may be utilized. Conversely, if sensors of different types generate the first sensor information and the second sensor information, for example, one sensor is a camera sensor while another sensor is a LIDAR sensor, it is possible that different types of object detection albums may be utilized. Nevertheless, in either case, some type of object detection algorithm will be utilized to detect objects within the shared field-of-view.

The pollution detection module 178 includes instructions that, when executed by the processor(s) 110, may cause the processor(s) 110 to determine one or more discrepancies between the objects detected using the first sensor information and the second sensor information. As such, as previously explained, the pollution detection module 178 may cause the processor(s) 110 to count the number of objects located within the shared field-of-view as detected by the object detection algorithm using the first sensor information and compare it to the number of objects within shared field-of-view as detected by the object detection algorithm using the second sensor information. If there is a discrepancy, one of the sensors may be polluted and/or otherwise dirtied and needs cleaning. If this is the case, a signal may be outputted by the sensor pollution detection system 160 to the output system 150 of the vehicle 100. The output system 150 may then output a visual, audible, or haptic signal so that the operator is aware that one or more of the sensors should be cleaned.

Figure 6:
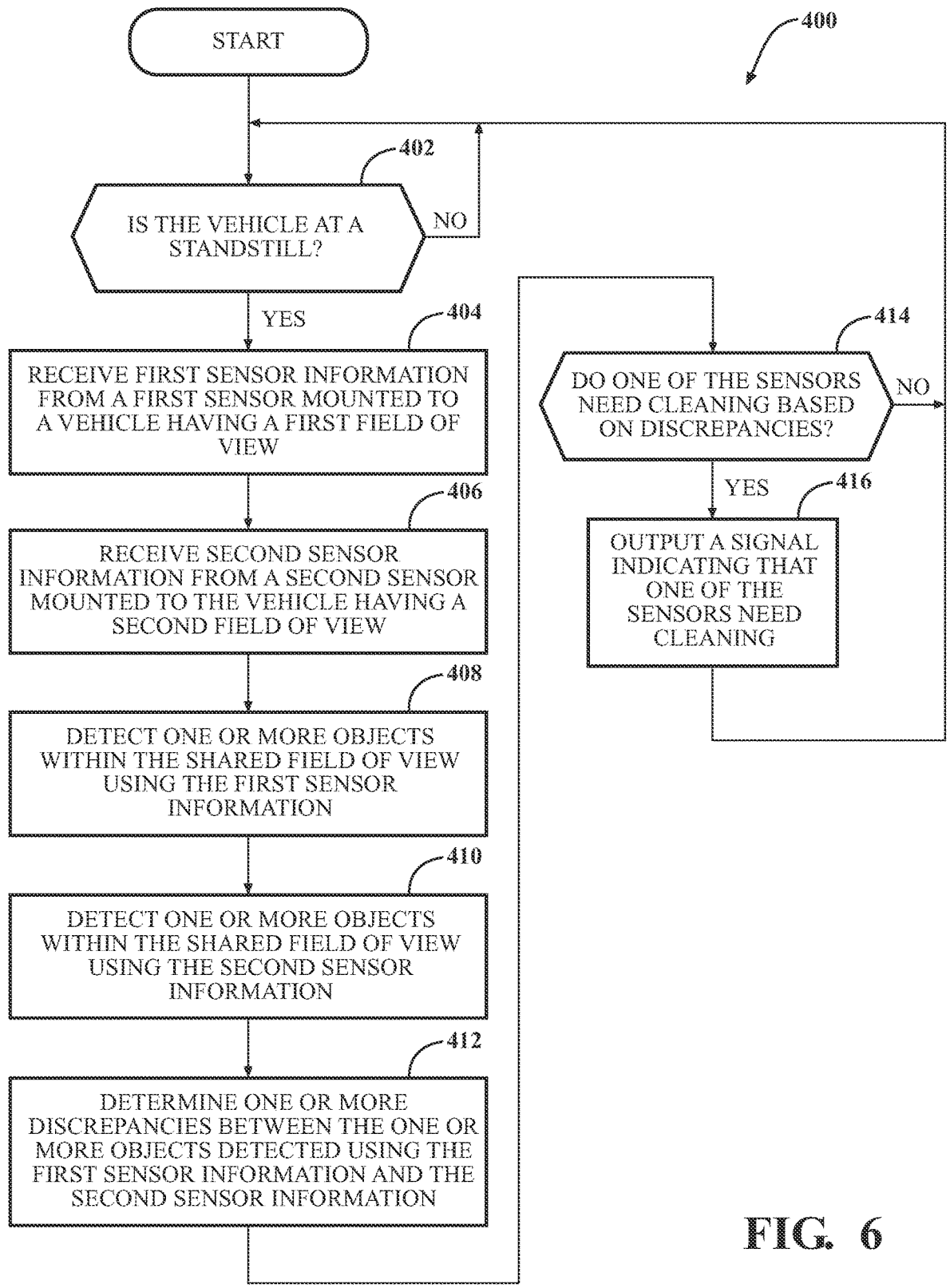
FIG. 6 illustrates a method for detecting when a sensor is polluted.

Referring to FIG. 6, a method 400 for determining when a sensor is polluted is shown. The method 400 will be described from the viewpoint of the vehicle 100 of FIG. 2 and the sensor pollution detection system 160 of FIG. 3. However, it should be understood that this is just one example of implementing the method 400. While the method 400 is discussed in combination with the sensor pollution detection system 160, it should be appreciated that the method 400 is not limited to being implemented within the sensor pollution detection system 160 but is instead one example of a system that may implement the method 400.

In step 402, the receiver module 176 may cause the processor(s) 110 to determine if the vehicle 100 is at a standstill. Moreover, the processor(s) 110 may receive information from one or more sensors, such as the sensor system 120 or from the vehicle control system(s) 130 that may include sensors that can detect movement of the vehicle, such as accelerometers, wheel speed sensors, and the like. It should be understood that the step 402 may not necessarily be performed. However, it may be advantageous to perform the step 402 to minimize variables regarding collecting information from sensors. Moreover, the movement of the vehicle 100 may slightly degrade the ability of the object detection algorithms to detect objects from sensor information from the sensors. By eliminating the need to account for the movement of the vehicle 100, the method 400 may be more accurate.

In steps 404 and 406, which may be performed sequentially in the order stated, in the reverse, or simultaneously, the receiver module 176 may cause the processor(s) 110 to receive first sensor information from a first sensor mounted to the vehicle 100 having a first field-of-view (step 404) and receive second sensor information from a second sensor mounted to the vehicle 100 having a second field-of-view (step 406). The first sensor information and the second sensor information may be stored within the data store(s) 171 as first sensor information 172 and second sensor information 174, respectively. As explained previously, the first sensor information 172 and/or the second sensor information 174 may be the data collected from two different sensors, such as the sensor 121 and the sensor 124 or any other of the sensors that form the sensor system 120 that have a shared field of view.

In steps 408 and 410, which may be performed sequentially in the order stated, in the reverse, or simultaneously, the object detection module 177 causes the processor(s) 110 to detect one or more objects within the shared field-of-view using the first sensor information and one or more objects within the shared field-of-view using the second sensor information independently. Objects are detected separately within the shared field-of-view using the first sensor information and the second sensor information. As explained previously, the object detection may be performed using any one of a number of different object detection algorithms. Additionally, one type of object detection algorithm may be utilized for one type of sensor information, while another type of object detection algorithm may be utilized for another type of sensor information. This may be especially true if the first sensor and the second sensor are different types of sensors, such as one sensor being a camera sensor 124 and the other sensor being a LIDAR sensor 121.

In step 412, the pollution detection module 178 includes instructions that, when executed by the processor(s) 110, may cause the processor(s) 110 to determine one or more discrepancies between the objects detected using the first sensor information and the second sensor information. Different types of discrepancies could be considered. For example, the discrepancies could be the number of objects detected using the first sensor information compared to the number of objects detected using the second sensor information. In addition to looking at the number of objects, other information could be utilized as well. For example, some object detection algorithms can determine object type as well.

In step 414, the pollution detection module 178 includes instructions that, when executed by the processor(s) 110, may cause the processor(s) 110 to determine if one of the sensors need cleaning based on these discrepancies. As such, as previously explained, the pollution detection module 178 may cause the processor(s) 110 to count the number of objects located within the shared field-of-view as detected by the object detection algorithm using the first sensor information and compare it to the number of objects within shared field-of-view as detected by the object detection algorithm using the second sensor information. If the sensors do not need cleaning, the method 400 returns to step 402 and begins again.

Otherwise, in step 416, the pollution detection module 178 includes instructions that, when executed by the processor(s) 110, may cause the processor(s) 110 to output a signal to the output system 150 of the vehicle 100. The output system 150 may then output a visual, audible, or haptic signal so that the operator is aware that one or more of the sensors should be clean. After that, the method 400 may either end or return to step 402 and begin again.

FIG. 1 will now be discussed in full detail as an example environment within which the system and methods disclosed herein may operate. In one or more embodiments, the vehicle 100 is an autonomous vehicle, but could also be a nonautonomous or semi-autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle 100 along a travel route, and a vehicle operator (i.e., driver) provides inputs to the vehicle to perform a portion of the navigation and/or maneuvering of the vehicle 100 along a travel route.

The vehicle 100 can include the processor(s) 110. In one or more arrangements, the processor(s) 110 can be a main processor of the vehicle 100. For instance, the processor(s) 110 can be an electronic control unit (ECU). The vehicle 100 can include the sensor system 120. The sensor system 120 can include one or more sensors. "Sensor" means any device, component, and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

The vehicle 100 can include an input system 140. An "input system" includes any device, component, system, element, or arrangement, or groups that enable information/data to be entered into a machine. The input system 140 can receive an input from a vehicle passenger (e.g., a driver or a passenger). The vehicle 100 can include an output system 150. An "output system" includes any device, component, or arrangement, or groups thereof that enable information/data to be presented to a vehicle passenger (e.g., a person, a vehicle passenger, etc.).

The vehicle 100 can include one or more vehicle control system(s) 130. Various examples of the vehicle control system(s) 130 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a steering control 131 for controlling the steering of the vehicle 100, a throttle control 132 for controlling the throttle of the vehicle 100, a braking control 133 for controlling the braking of the vehicle 100, and/or a transmission control 134 for controlling the transmission and/or other powertrain components of the vehicle 100. These systems can include one or more devices, components, and/or a combination thereof, now known or later developed.

The vehicle 100 can include one or more modules, at least some of which are described herein. The modules can be implemented as computer-readable program code that, when executed by a processor(s) 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving system 170. The autonomous driving system 170 can be configured to receive data from the sensor system 120 and/or any other type of system capable of capturing information relating to the vehicle 100 and/or the external environment of the vehicle 100. In one or more arrangements, the autonomous driving system 170 can use such data to generate one or more driving scene models. The autonomous driving system 170 can determine the position and velocity of the vehicle 100. The autonomous driving system 170 can determine the location of obstacles, obstacles, or other environmental features, including traffic signs, trees, shrubs, neighboring vehicles, pedestrians, etc.

The autonomous driving system 170 can be configured to receive and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include accelerating, decelerating, braking, turning, moving in a lateral direction of the vehicle 100, changing travel lanes, merging into a travel lane, and/or reversing, just to name a few possibilities. The autonomous driving system 170 can be configured to implement determined driving maneuvers. The autonomous driving system 170 can cause, directly or indirectly, such autonomous driving maneuvers to be implemented. As used herein, "cause" or "causing" means to make, command, instruct, and/or enable an event or action to occur or at least be in a state where such event or action may occur, either directly or indirectly. The autonomous driving system 170 can be configured to execute various vehicle functions and/or to transmit data to, receive data from, interact with, and/or control the vehicle 100 or one or more systems thereof (e.g., one or more of vehicle control system(s) 130.

Detailed embodiments are disclosed herein. However, it is to be understood that the disclosed embodiments are intended only as examples. Therefore, specific structural and functional details disclosed herein are not to be interpreted as limiting but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements can also be embedded in an application product that comprises all the features enabling the implementation of the methods described herein and, when loaded in a processing system, can carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Generally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system comprising:
   a processor;
   a memory in communication with the processor, the memory including a receiver module, an object detection module, and a pollution detection module;
   wherein the receiver module includes instructions that, when executed by the processor, cause the processor to:
      receive first sensor information from a first sensor mounted to a vehicle having a first field of view, and
      receive second sensor information from a second sensor mounted to the vehicle having a second field of view, wherein at least a portion of the second field of view overlaps at least a portion of the first field of view to define a shared field of view;
   wherein the object detection module includes instructions that, when executed by the processor, cause the processor to:
      determine a number of objects detected within the shared field of view using the first sensor information, and
      determine a number of objects detected within the shared field of view using the second sensor information; and
   wherein the pollution detection module includes instructions that, when executed by the processor, cause the processor to determine that one of the first sensor and the second sensor needs cleaning when there is a difference between the number of objects detected within the shared field of view using the first sensor information and the number of objects detected within the shared field of view using the second sensor information.

2. The system of claim 1, wherein the receiver module further includes instructions that, when executed by the processor, cause the processor to receive the first sensor information and receive the second sensor information when the vehicle is at a standstill.

3. The system of claim 1, wherein the pollution detection module further includes instructions that, when executed by the processor, cause the processor to:
   determine if the number of objects detected within the shared field of view using the first sensor information is greater than the number of objects detected within the shared field of view using the second sensor information; and
   output a signal indicating that the second sensor needs cleaning.

4. The system of claim 1, wherein the first sensor and the second sensor are of different sensor types.

5. The system of claim 4, wherein the first sensor is a LIDAR sensor and the second sensor is a camera sensor.

6. The system of claim 1, wherein the first sensor and the second sensor are a same type of sensor.

7. A method comprising the steps of:
   receiving first sensor information from a first sensor mounted to a vehicle having a first field of view;
   receiving second sensor information from a second sensor mounted to the vehicle having a second field of view, wherein at least a portion of the second field of view overlaps at least a portion of the first field of view to define a shared field of view;
   determining a number of objects detected within the shared field of view using the first sensor information;
   determining a number of objects detected within the shared field of view using the second sensor information; and
   determining that one of the first sensor and the second sensor needs cleaning when there is a difference between the number of objects detected within the shared field of view using the first sensor information and the number of objects detected within the shared field of view using the second sensor information.

8. The method of claim 7, wherein the steps of receiving the first sensor information and receiving the second sensor information are performed when the vehicle is at a standstill.

9. The method of claim 7, further comprising the steps of:
   determining if the number of objects detected within the shared field of view using the first sensor information is greater than the number of objects detected within the shared field of view using the second sensor information; and
   outputting a signal indicating that the second sensor needs cleaning.

10. The method of claim 7, wherein the first sensor and the second sensor are of different sensor types.

11. The method of claim 10, wherein the first sensor is a LIDAR sensor and the second sensor is a camera sensor.

12. The method of claim 7, wherein the first sensor and the second sensor are a same type of sensor.

13. A non-transitory computer-readable medium storing instructions that, when executed by a processor, causes the processor to:
   receive first sensor information from a first sensor mounted to a vehicle having a first field of view;
   receive second sensor information from a second sensor mounted to the vehicle having a second field of view, wherein at least a portion of the second field of view overlaps at least a portion of the first field of view to define a shared field of view;
   determine a number of objects detected within the shared field of view using the first sensor information;
   determine a number of objects detected within the shared field of view using the second sensor information; and
   determine that one of the first sensor and the second sensor needs cleaning when there is a difference between the number of objects detected within the shared field of view using the first sensor information and the number of objects detected within the shared field of view using the second sensor information.

14. The non-transitory computer-readable medium of claim 13, wherein receiving the first sensor information and receiving the second sensor information are performed when the vehicle is at a standstill.

15. The non-transitory computer-readable medium of claim 13, further comprising instructions that, when executed by the processor, causes the processor to:
   determine if the number of objects detected within the shared field of view using the first sensor information is greater than the number of objects detected within the shared field of view using the second sensor information; and
   output a signal indicating that the second sensor needs cleaning.

16. The non-transitory computer-readable medium of claim 13, wherein the first sensor and the second sensor are of different sensor types.

17. The non-transitory computer-readable medium of claim 16, wherein the first sensor is a LIDAR sensor and the second sensor is a camera sensor.

* * * * *